US007120165B2

(12) United States Patent
Kasvand-Harris et al.

(10) Patent No.: US 7,120,165 B2
(45) Date of Patent: Oct. 10, 2006

(54) METHOD AND SYSTEM FOR ALLOCATING AND CONTROLLING LABELS IN MULTI-PROTOCOL LABEL SWITCHED NETWORKS

(75) Inventors: Angelica Grace Emelie Kasvand-Harris, Ottawa (CA); Udo Mircea Neustadter, Ottawa (CA); Walter Joseph Carpini, Ottawa (CA); Barry Ding Ken Mark, Ottawa (CA)

(73) Assignee: Tropic Networks Inc., Kanata (CA)

( * ) Notice: Subject to any disclaimer, the term of this patent is extended or adjusted under 35 U.S.C. 154(b) by 1068 days.

(21) Appl. No.: 10/143,780

(22) Filed: May 14, 2002

(65) Prior Publication Data

US 2002/0172155 A1 Nov. 21, 2002

Related U.S. Application Data

(60) Provisional application No. 60/290,633, filed on May 15, 2001, provisional application No. 60/300,442, filed on Jun. 26, 2001.

(51) Int. Cl.
*H04J 3/16* (2006.01)
(52) U.S. Cl. ................ 370/466; 370/400; 370/392; 370/229
(58) Field of Classification Search ............... None
See application file for complete search history.

(56) References Cited

U.S. PATENT DOCUMENTS

| | | | | |
|---|---|---|---|---|
| 6,336,129 B1* | 1/2002 | Ise et al. | ............ | 709/201 |
| 6,665,273 B1* | 12/2003 | Goguen et al. | ............ | 370/252 |
| 6,735,190 B1* | 5/2004 | Chuah et al. | ............ | 370/352 |
| 6,839,320 B1* | 1/2005 | Paridaens et al. | ............ | 370/230 |
| 7,012,919 B1* | 3/2006 | So et al. | ............ | 370/392 |
| 2001/0053149 A1* | 12/2001 | Mo et al. | ............ | 370/389 |
| 2002/0163889 A1* | 11/2002 | Yemini et al. | ............ | 370/238 |

OTHER PUBLICATIONS

IETF Draft, "A Path Protection/Restoration Mechanism for MPLS Networks", Jul. 2001, by Owens, et al.
IETF Draft, "Extensions to RSVP-TE for MPLS Path Protection", Jul. 2001, Owens et al.
IETF Draft, "LSP Hierarchy with MPLS TE", Mar. 2001, by Kompella et al.
IETF Draft, "Multiprotocol Label Switching Architecture", Jan. 2001, by Rosen, et al.

\* cited by examiner

*Primary Examiner*—Bob A. Phunkulh
(74) *Attorney, Agent, or Firm*—Victoria Donnelly (57) ABSTRACT

A method and system for allocating and controlling a hierarchy of labels in an MPLS network is provided. The hierarchy of labels, inserted into MPLS packets, is introduced so as to correspond to the hierarchy of sub-flows within a data flow. The labels have the established dependency so that positions of labels in the hierarchy identify a sequence of processing the labels and functions associated with the labels. The system for allocating and controlling the hierarchy of MPLS labels includes a first control plane mapper for releasing available labels, a first controller for assigning the released labels according to the hierarchy, means for transmitting the labels in the network, a second controller for detecting the labels, and a second control plane mapper for maintaining current label dependency within the hierarchy. If required, re-addressing of the hierarchy of labels may be performed to maintain flow-sub-flow association throughout two adjacent networks. In the preferred embodiments on the invention the method of allocating and controlling hierarchy of labels is applied to sub-flows within FA-LSP flows, and to multi-cast services in the network associated with a function of flooding and filtering data within a network node.

35 Claims, 5 Drawing Sheets

METHOD AND SYSTEM FOR ALLOCATING AND CONTROLLING LABELS IN MULTI-PROTOCOL LABEL SWITCHED NETWORKS

RELATED APPLICATIONS

This patent application claims the benefit of U.S. provisional applications "Method and Apparatus for Controlling Allocation and Stacking of MPLS Labels in Telecommunications Networks" to Kasvand Harris, Ser. No. 60/290,633 filed May 15, 2001, and "Broadcast/Multi-cast in an MPLS VPN" to Mark, Ser. No. 60/300,442 filed Jun. 26, 2001.

FIELD OF THE INVENTION

This invention relates to Multi-Protocol Label Switching (MPLS) networks, and in particular, to a method and system for allocating and controlling labels in an MPLS network.

BACKGROUND OF THE INVENTION

Multi-protocol Label Switching is an Internet Engineering Task Force (IETF) initiative that integrates Layer 2 information about network links (bandwidth, latency, utilization) into Layer 3 Internet Protocol (IP) within a particular autonomous system or Internet Service Provider (ISP) to simplify and improve IP-packet exchange.

In an MPLS network, incoming packets are assigned a "label" (identifier) by Label Edge Routers (LERs). These labels not only map to information based on the routing table entry (i.e., destination, bandwidth, delay, and other metrics), but also refer to the IP header field (source IP address), Layer 4 socket number information, and class of service. Once this classification is complete and mapped, different packets are assigned to corresponding Labeled Switch Paths (LSPs).

With these LSPs, network operators can divert and route traffic based on data-stream type and Internet-access customer. MPLS gives network operators a flexibility to divert and route traffic around link failures, congestion, and bottlenecks.

Numerous improvements to MPLS technology and applications of MPLS technology to telecommunications networks have been suggested and tried so far.

The IETF Draft "A Path Protection/Restoration Mechanism for MPLS Networks", July 2001, by Owens et al http://www.watersprings.org/links/mlr/id/draft-chang-mpls-path-protection-03.txt describes the functioning of a Label Switched Router (LSR) as a vehicle for maintaining classes of service and service restoration for paths between nodes in a network.

Another IETF draft "Extensions to RSVP-TE for MPLS Path Protection", July 2001, also by Owens et al, http://www.watersprings.org/links/mlr/id/draft-chang-mpls-rs-vpte-path-protection-ext-02.txt deals with the signaling systems involved in path set up in an MPLS labeling system. This paper describes objects that have been added to create a label switched path (LSP) tunnel, which for this purpose include RECORD-ROUTE, SESSION-ATTRIBUTE, EXPLICIT-ROUTE, LABEL-REQUEST and LABEL. These processes describe how to set up and manage flows in a data network.

Another IETF Draft, "LSP Hierarchy With MPLS TE" by Kireeti Kompella and Yakov Rekhter, March 2001, introduces the concept of a tunnel by using LSPs within an LSP, in which a traditional label allocation and distribution approach has been used (generally referring to a per platform label space or a per interface label space).

One of the recent IETF drafts that discusses MPLS is RFC 3031 "Multi-protocol Label Switching Architecture" by E. Rosen from Cisco Systems, A. Viswanathan from Force 10 Networks, Inc., and R. Callon from Juniper Networks, Inc., dated January 2001, which includes the discussion of the label space (Section 3.14 Scope and Uniqueness of Labels). The document discusses the traditional per-platform and per-interface label space, and it also mentions multiple per interface or multiple per platform label spaces. This document states that the "level" of the label is irrelevant and that there is no notion of different label spaces for different labels in the hierarchy.

Unfortunately, the above mentioned approaches for label allocation in MPLS networks have drawbacks and may cause label collision in certain protection schemes, e.g. during tunnel Forwarding Adjacency (FA)-LSP protection. They are also not suitable for expeditious handling of data flows having complex structure.

Accordingly, there is a need in industry for the development of an improved approach for allocating and controlling labels in an MPLS network, which would avoid the above-mentioned problems, while being simple and efficient.

SUMMARY OF THE INVENTION

Therefore there is an object of the invention to provide a method and apparatus for allocating and controlling labels in an MPLS network, and the MPLS network using thereof, which would avoid the above mentioned problems.

According to one aspect of the invention, there is provided a data network having a plurality of nodes, comprising:

means for allocating a hierarchy of attribute labels to data in a data flow, comprising a hierarchy of data sub-flows, so that the hierarchy of the allocated labels corresponds to the hierarchy of data sub-flows within the data flow;

means for transmitting data having the allocated labels between the nodes in the network; and means for detecting the allocated labels and processing the labels according to the label hierarchy.

Advantageously, the network is a packet network, e.g. a Multi-Protocol Label Switched (MPLS) network having the data flow between two label edge routers. Alternatively, the network may be a frame network, e.g. a high density link controlling (HDLC) network, which allows allocation of labels.

The means for allocating the hierarchy of labels comprises means for establishing dependency of labels within the hierarchy so that positions of labels in the hierarchy identify a sequence of processing of the labels and functions associated with the labels. The means for allocating the hierarchy of labels further comprises:

a first control plane mapper for releasing available labels, and a first controller for assigning the released labels according to the label hierarchy.

The first control mapper may comprise a state machine capable of allocating a unique hierarchy of labels for each of the flow and sub-flow combination between the edge routers.

The means for transmitting mentioned above comprises a line driving device on a forwarding node and a receiving interface on a receiving node, and the means for detecting comprises a second controller for detecting the hierarchy of labels according to the label dependency, and a second control plane mapper for maintaining current label dependency within the hierarchy.

Beneficially, the hierarchy of labels includes N labels, each label in the hierarchy being dependent upon, and processed immediately after, and deriving its function from the label above it. In many common situations N=2, and the hierarchy of labels comprises a first label and a second label, the second label being dependent on the first one. Alternatively, N may be equal to 3, or selected from a range from 4 to 10 as required. To comply with MPLS standards, the means for allocating labels comprises means for allocating a space for each label itself equal to 20 bits (without a header and other relevant information). Alternatively, the means for allocating labels may comprise means for allocating a space for each label in the hierarchy within a range from 4 bits to 128 bits.

Advantageously, the described MPLS network may further comprise means for re-addressing the hierarchy of labels at the label edge router.

In the first embodiment of the invention the MPLS network provides allocation of two labels in the hierarchy, the first label identifying a Forwarding Agency label switched path (FA-LSP) flow, and the second label identifying a sub-flow within the FA-LSP flow.

In the second embodiment of the invention, the MPLS network provides allocation of two labels in the hierarchy, one of the labels in the hierarchy is a multi-cast service label, and the other label identifies the egress LSP label to be dependent onto the multi-cast label to define the path to the next destination.

The multi-cast service label is associated with a function for flooding data to all ports within a node, and simultaneously enabling only those ports at the node, for which egress is required. Conveniently, all packets labeled with the same multi-cast label follow the same label switched path in the network. Beneficially, the same path may be the path established so as to provide one of the following: required traffic load in the network, and controlled delay in arrival times of the multi-cast packets.

According to another aspect of the invention there is provided a method for managing data in communications data network, comprising the steps of:

forming a data flow, having a hierarchy of data sub-flows;

allocating a hierarchy of attribute labels to data in the data flow, corresponding to the hierarchy of data sub-flows;

transmitting data having the allocated labels between nodes in the network;

detecting the allocated labels; and processing the labels according to the label hierarchy.

Advantageously, the method is applied for managing data in Multi-Protocol Label Switched (MPLS) packet network having the data flow between two label edge routers. The step of allocating the hierarchy of labels comprises establishing dependency of labels within the hierarchy so that positions of labels in the hierarchy identify a sequence of processing of the labels and functions associated with the labels. The step of allocating the hierarchy of labels further comprises releasing available labels and assigning the released labels according to the label hierarchy, including releasing of a unique hierarchy of labels for each of the flow and sub-flow combination between the edge routers.

Conveniently, the step of allocating comprises allocating the hierarchy of labels including N labels, each label in the hierarchy being dependent upon, and processed immediately after, and deriving its function from the label above it. The step of allocating comprises allocating labels so that each of the labels itself occupies one of the following:

a space of 20 bits;

a space within a range from 4 bits to 128 bits.

Conveniently, the step of allocating may further comprise re-addressing the labels within the hierarchy.

In the method of the first embodiment, the step of allocating comprising allocating the hierarchy including a first and second labels (N=2), the first label identifying a Forwarding Agency label switched path (FA-LSP) flow, and the second label identifying a sub-flow within the FA-LSP flow.

In the second embodiment, the step of allocating comprises allocating one of the labels in the hierarchy as a multi-cast service label and associating a function with this label that all packets having the same multi-cast label follow the same label switched path in the network. The step of allocating further comprises associating another function with the multi-cast service label, which provides flooding of data to all ports within a node and simultaneously enables only those ports at the node, for which egress is required. Beneficially, the step of allocating comprises allocating another label in the hierarchy, which identifies the egress LSP label to be dependent onto the multi-cast label to define the path to the next destination.

According to yet another aspect of the invention there is provided a system for allocating and controlling labels in an MPLS packet network, comprising:

means for allocating a hierarchy of attribute labels to packets in a data flow, comprising a hierarchy of data sub-flows, so that the hierarchy of the allocated labels corresponds to the hierarchy of data sub-flows within the data flow; means for transmitting packets having the allocated labels between the nodes in the network; and means for detecting the allocated labels and processing the labels according to the label hierarchy.

The embodiments of the invention described above provide numerous advantages. They allow a hierarchy of labels to be appended to MPLS packets, which is associated with sub-flows within a flow, and provides certain complimentary information. The immediate availability of the sub-flows, without further processing, is an additional advantage. Additional value lies in the ability to overlay a grouping of packets within a system which already has an MPLS flow mechanism, and to insert these sub-flows without the need for any changes to the primary flow mechanisms, technology or processes.

BRIEF DESCRIPTION OF THE DRAWINGS

Embodiments of the invention will now be described, by way of example, with reference to the accompanying drawings in which.

DETAILED DESCRIPTION OF PREFERRED EMBODIMENTS

A method of allocating and controlling labels in an MPLS network according to the first embodiment of the invention is directed specifically at MPLS networks, which implement a FA-LSPs (Forwarding Agency driving a Label Switched Path) technology. This is a technology, which is particularly well suited to router based networks as it presupposes LSP nodes which can operate autonomously. Label Edge Routers (LERs) add label space to each packet to be treated. Then LSRs, which may be in the links between LERs only look at the topmost label for state information. More detailed description of FA-LSP technology can be found in IETF Draft #RFC 2026 "Hierarchy With MPLS TE" to Kireeti Kompella et al. cited above.

Figure 1:
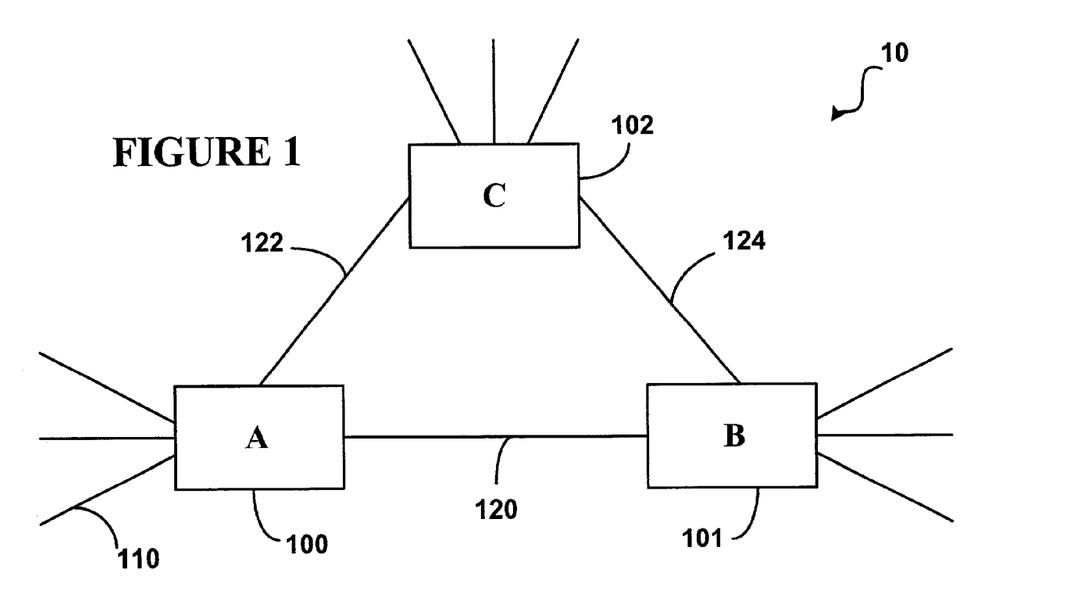
FIG. 1 is an exemplary diagram of a network used for illustrating a method for allocating and controlling labels according to a first embodiment of the invention.

An exemplary diagram of an MPLS network 10 used for illustrating the method for allocating and controlling labels in MPLS networks according to the first embodiment is shown in FIG. 1. The network 10 comprises three LER nodes "A", "B" and "C" designated by reference numerals 100, 101 and 102 respectively. The nodes are connected with each other via data communication media (links) 120, 122 and 124, namely link 120 connect nodes "A" and "B", link 122 connects nodes "A" and "C", and link 124 connects nodes "B" and "C". The link operational in a normal mode is link 120, which may include a number of LSRs. Data is input to the node "A" (the forwarding node) from a source (not shown) via another link 110 (only portion of the link 110 is shown), and is output at the node "B" (the receiving node). An alternate path to connect nodes "A" and "B" via links 122 and 124 going through the node "C" may also be used, the alternate path may also include a number of LSRs.

Figure 2:
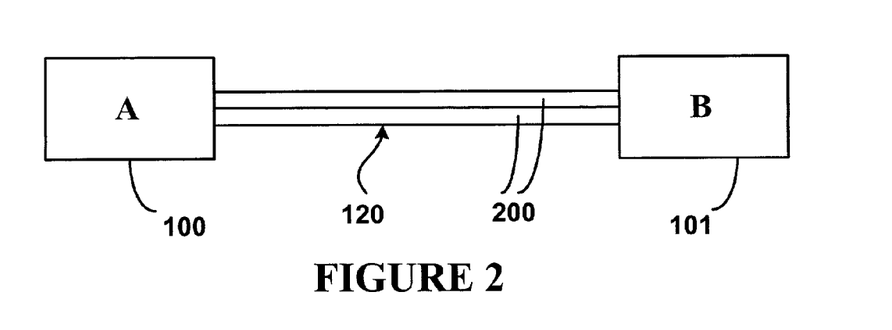
FIG. 2 is a diagram illustrating flows of data in the network of FIG. 1.

FIG. 2 illustrates flows of data transmitted by the link 120. Within the link 120, there may be a number, from 1 to n, of flows that are established by the forwarding node "A", the flows being designated by reference numeral 200. Each flow 200 in this link has a predetermined capacity.

Figure 3:
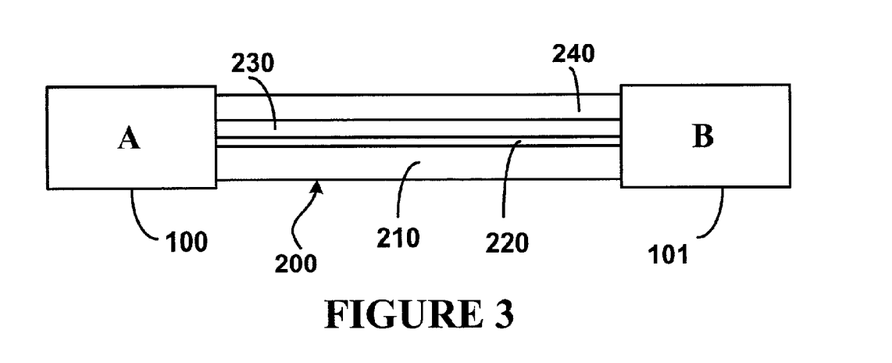
FIG. 3 is a diagram illustrating sub-flows of data within the flow of data of FIG. 2.

FIG. 3 shows one of the flows 200 in more detail. Each of the flows 200 has a hierarchical structure, i.e. it includes a number of sub-flows, from 1 to n, some of the sub-flows being designated with reference numerals 210, 220, 230 and 240. Each of the sub-flows 210–240 may have similar or different flow attributes.

Figure 4:
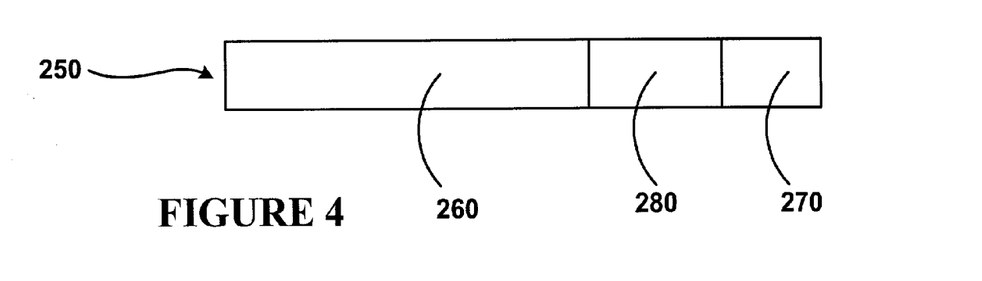
FIG. 4 is a diagram of a data packet having a hierarchy of labels.

The method of the first embodiment of the invention proposes a hierarchical label allocation scheme, which corresponds to the flow-sub-flow hierarchy and operates between LERs. FIG. 4 is a diagram illustrating a data packet 250 of the first embodiment having a hierarchy of two labels. A basic packet 260 is appended with a first label 270, which operates with the LSP and identifies a FA-LSP flow, and a second label 280 identifying a sub-flow of data within the FA-LSP flow, the second label being dependent on the first one and processed immediately after the first one. Each label may have an associated function to be performed when the label is processed. In the first embodiment, the first and second labels 270 and 280 are of the same length as standard MPLS fields, i.e. the labels themselves occupy a space of 20 bits within the 32 bit label stack entries, please refer to RFC-3032 Label Stack Encoding by E. Rosen cited above. Due to the specific function assigned to the content of these labels, the receiving LER node is designed to be able to immediately reference the labels to Incoming Label Maps (ILMs). This granularity of label referencing extends all the way down to any sub-flow.

Figure 5:
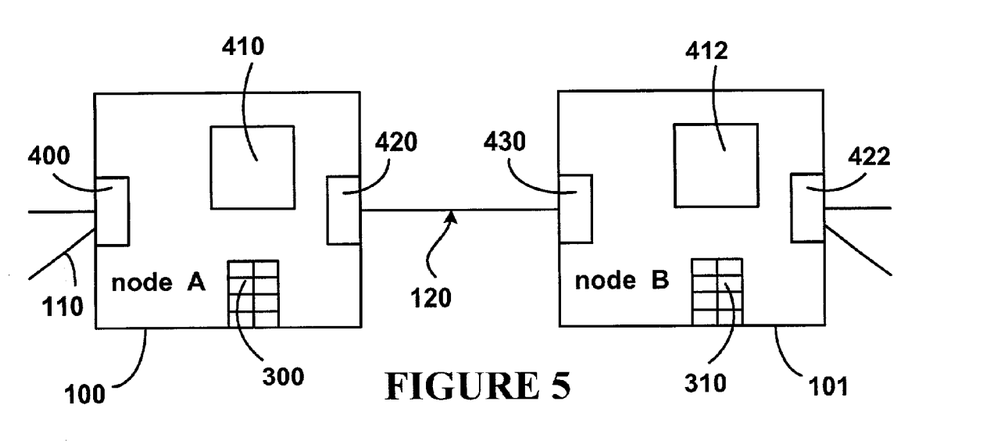
FIG. 5 is a diagram illustrating means for allocating, transmitting and processing data having the hierarchy of label attributes.

FIG. 5 shows the means for allocating, transmitting and processing data having the hierarchy of labels. Data incoming to the forwarding node "A" via link 110 is interfaced by an input interface 400 having a sequencing type device, commonly known in the industry. The data is then reorganized by a first controller 410 according to the needs of a line driving device 420 which has a forwarding interface. The first controller 410 derives its specific port allocation and controlling information from the first control plane mapper 300. The first control plane mapper 300 maintains relationships for allocating sub-flows 210–240 within the flows 200. As the basic packet 260 is processed by the first controller 410, the controller 410 adds two labels 270 and 280 to the basic packet 260, thus, forming the packet 250.

At the receiving LER node "B", the inverse process occurs. The receiving interface 430, which has a number of ports, steers the incoming packets having the unique extra two fields to a second controller 412. The second controller 412 is enabled by being referenced to a receiving control plane mapper 310, which is linked logically to the first control plane mapper 300 via standard data communication processes. The second controller 412 removes the first and second labels 270 and 280 added to the basic packet 260, performs various analysis, and then routes the processed packets to the appropriate exit interface 422.

Figure 6:
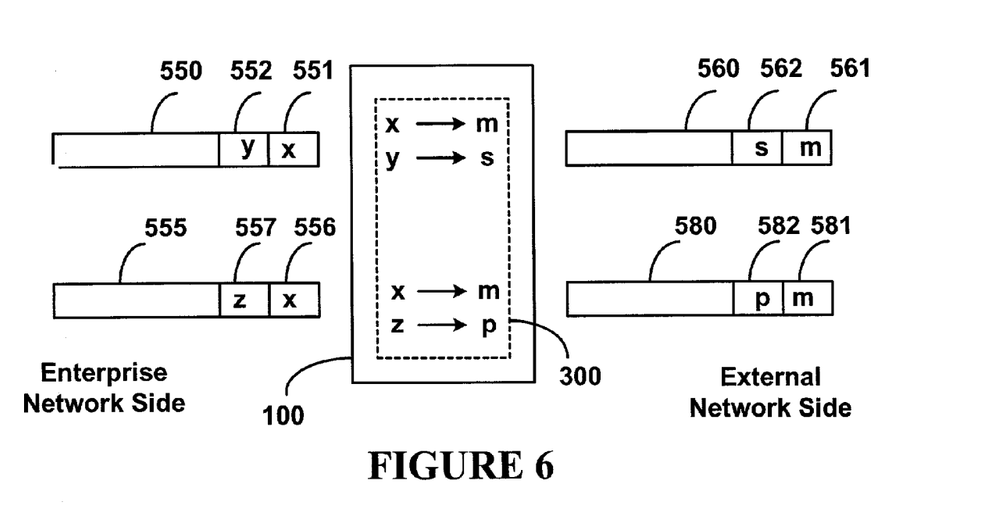
FIG. 6 is a diagram illustrating means for re-addressing labels for data packets traversing from one network to another.

FIG. 6 illustrates re-addressing the hierarchy of labels for data packets traversing from one network to another, i.e. how the relationships of flows and sub-flows between adjacent LERs for communicating networks is being maintained. In this case, each label in the hierarchy may be given a different addresses if required. Additionally, a cross address referencing among adjacent LERs 100 and 101 for rapid and simple conveyance of a set of associated data streams is provided. The sharing of link associations is transmitted between LERs 100 and 101 by conventional mechanisms on a separate communication channel. For example, FIG. 6 illustrates a re-addressing process applied to a first and second packets 550 and 555 arriving from within a network ("Enterprise Network Side") at the LER 100. Each packet has the label hierarchy comprising two labels, namely the first packet 550 has labels 551 and 552 (wherein label 551 is the topmost label in the hierarchy identifying the FA-LSP flow, and label 552 identifying a first sub-flow within FA-LSP flow), and packet 555 has labels 556 and 557 (wherein label 556 in the topmost label in the hierarchy identifying the FA-LSP flow, and label 557 identifying a second sub-flow within the FA-LSP flow). The LER 100 determines that these packets 550 and 555 are to be forwarded into an adjacent network ("External Network Side") with the same flow relationship associations. The first control plane mapper 300 allocates new address spaces (re-addresses the labels), which are available in this adjacent network. Similar re-addressing function may be performed by the second control plane mapper 310 if the packets to be re-addressed arrive at the LER 101. The re-addressed packets 560 and 580 correspond to the packets 550 and 555 and have respective label hierarchies, namely label 561 corresponds to label 551, label 562 corresponds to label 552, label 581 corresponds to label 556, and label 582 corresponds to label 557, thus providing that existing flow-sub-flow relationship being maintained. The hierarchal address processing permits labels identifying sub-flows to be allocated from a label space unique to the FA-LSP, thus allowing re-usage of same labels at different layers in the hierarchy and expanding the whole label space exponentially. A set of labels forming a hierarchy is selected so as to be unique to avoid collision of label hierarchies in the network. The re-addressed packets 560 and 580 are then inserted into the adjacent network.

Thus, the method for managing data in communications network by allocating and controlling a hierarchy of labels in an MPLS network, which correspond to a flow-sub-flow relationship in the network, is provided.

Figure 7:
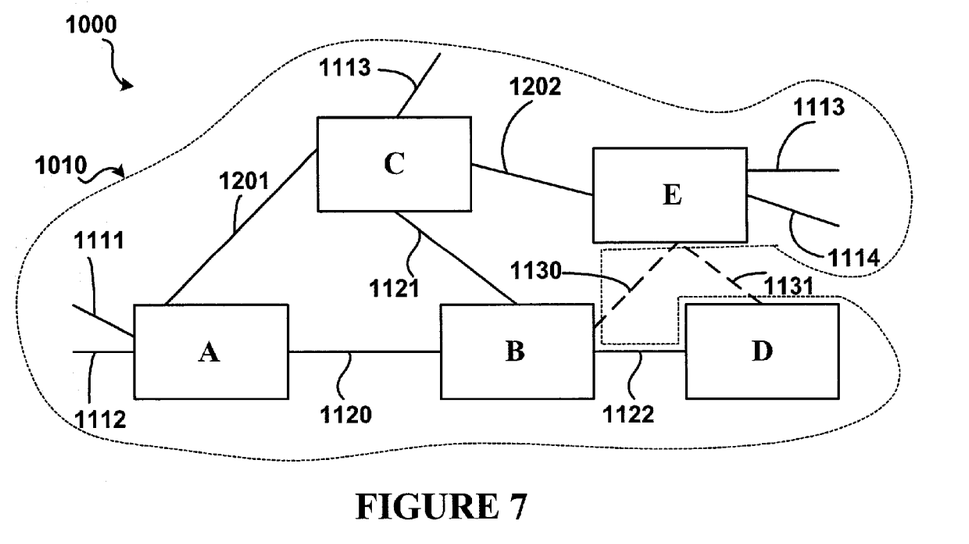
FIG. 7 is an exemplary diagram of a network used for illustrating a method for allocating and controlling labels according to a second embodiment of the invention.

A method for allocating and controlling labels in an MPLS network according to a second embodiment of the invention is particularly suitable for efficient multi-cast service in the network due to the label stacking technique. FIG. 7 shows an exemplary network 1000 having five nodes "A", "B", "C", "D" and "E" used for illustration purposes. The nodes are interconnected by LSPs 1120, 1121, 1122, 1201 and 1202. A service 1010 on this network is defined as the Nodes "A" through "E" and the LSPs indicated above. The network 1000 also has two additional links 1130 and 1131 shown in dashed lines, but they are not part of the service 1010.

A conventional uni-cast packet is shown being launched into service 1010 via Node "A" as uni-cast packet 1111 and exits the network via Node "E" as uni-cast packet 1114. The uni-cast packet 1111 is assigned a label hierarchy including two labels, the first label identifying the flow as a uni-cast flow, and the second label identifying the LSP path to get the uni-cast packet from Node "A" to Node "E" (path 1201 and 1202). The labels are assigned by a control plane mapper (not shown), which is similar to that first and second control plane mappers 300 and 310 of the first embodiment. As a result, the uni-cast packet 1111 becomes now a stacked LSP flow 1201 between Nodes "A" and "C" and a stacked LSP flow 1202 between Nodes "C" and "E".

Another situation is created with a multi-cast packet. A multi-cast packet 1112 is inserted into service 1010 at Node "A" and exits the service at Nodes "C" and "E" as packet 1113. The control plane mapper at the node "A" has the information that the service 1010 has to drop all multi-cast packets received at Node "A" to both Nodes "C" and "E". Instead of launching two flows of data, one for Node "C" and one for Node "E", only one data flow is necessary according to the second embodiment. Again, a hierarchy of labels is introduced into the multicast packet, wherein a first label in the hierarchy includes information that says that this is to be multi-cast and that it is multi-cast service "N", and a second label in the hierarchy identifies the LSPs of service 1010 which are to be used to get the multi-cast packet to Nodes "C" and "E".

Thus, the multi-cast packet 1112 now becomes a stacked label flow on LSP 1201 and is prevented from leaving any port of Node "A" except that port, which has been enabled for the stacked multi-cast packet 1112. In this way, data flow 1201 is being transmitted between Node "A" and Node "C". When multi-cast data flow 1201 arrives at Node "C", because it has a special multi-cast identification in its stacked label, it is flooded to all of the egress ports of node "C". The control plane mapper of node "C" instructs all ports on node "C" to inhibit the egress of data flow 1201. The exception is the port associated with flow 1113 which leaves the node "C" and LSP 1202. In the case of flow 1113, this port is enabled, so this port accepts multi-cast packets from flow 1201. Since this is an LER though, and the flow is a terminating here, and the first and second stacked labels are removed.

At node "C", data flow 1201 is subject to two processes. The first process is that it is streamed out of node "C" as egress stream 1113. The second process is that node "C" has been given instructions by the control plane mapper that the unique label 1201 is also to flow out of node "C" towards node "E" still as flow 1202. Node "E" has received instructions from the control plane mapper that flow 1202 is to egress Node "E" as flow 1114. This is done as described for the egress from the network at Node "C". Though there are many other paths in this network and service, however, only the path shown as 1201 and 1202 are used. Paths 1120, 1121 and 1122 in this example are disallowed.

Figure 8:
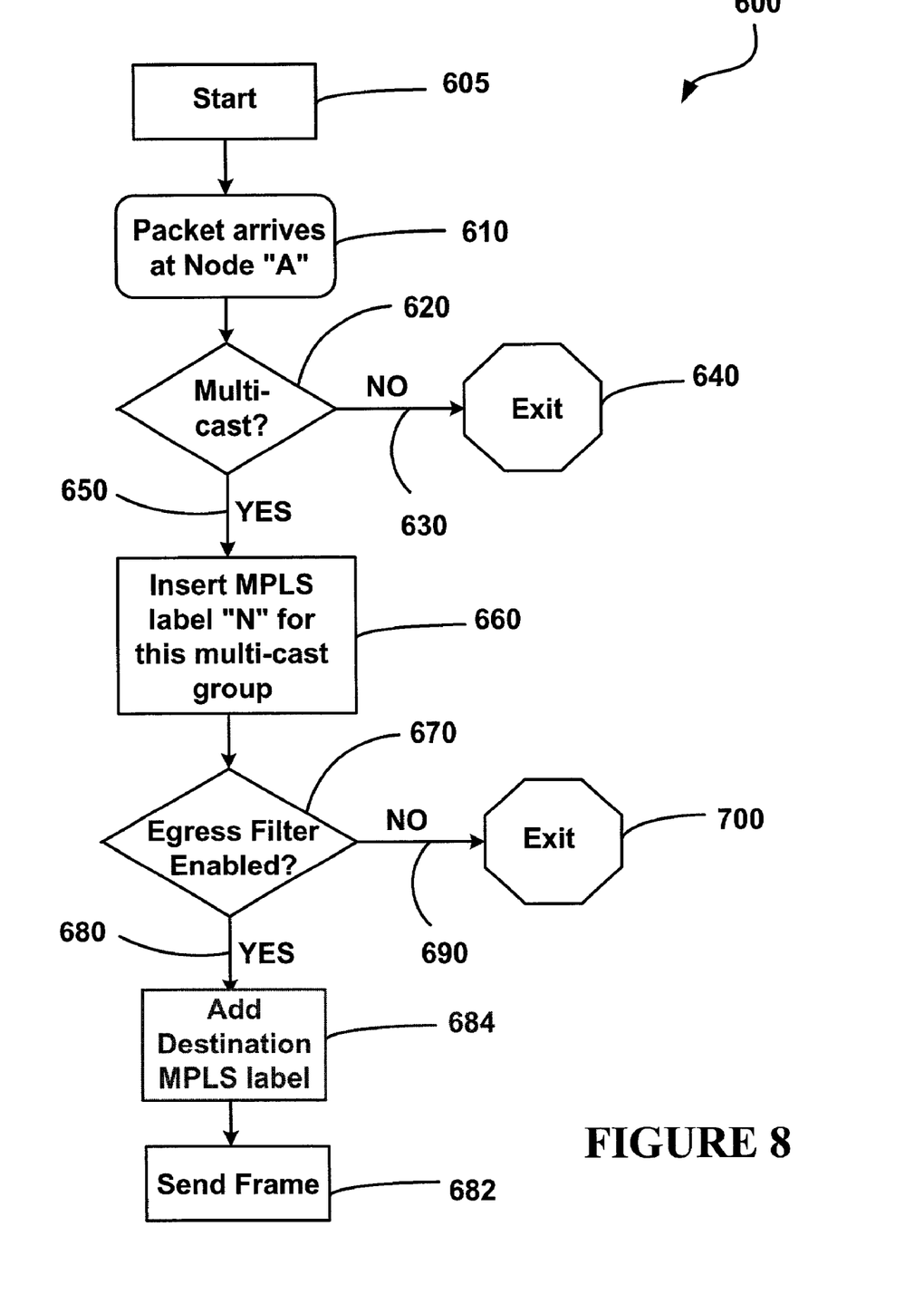
FIG. 8 is a flow chart illustrating processing of labels for multi-cast services on ingress to an LER.

FIG. 8 shows a flow chart diagram 600, illustrating the processing of labels for multi-cast services on ingress to an LER.

Upon the start (box 605) of the procedure 600, when a packet arrives at an ingress port 610, it is immediately checked to ascertain if it is to be treated as multi-cast 620. If the answer is "No" 630, then the packet exits the multi-cast operation (box 640), and is routed according to standard routing table and forwarding engine technology. If the answer is "Yes" 650, it is a packet stream 1112 ingress at Node "A", which is to be multi-cast so the control plane mapper adds with the first label a unique bit sequence (box 660). This unique bit sequence identifies the packet as a multi-cast service, and it also enables the assignment of a unique multi-cast service number "N".

Because it is to be multi-cast, it is now sent by a controller (similar to the one of the first controller 410 and second controller 412 of the first embodiment) to all egress ports of node "A". However, the control plane mapper has also enabled (box 670) all the ports, which are to pass this multi-cast flow, now flow 1201. Thus, only the enabled egress ports of node "A" can pass flow 1201 (output "Yes" from box 670 designated with reference numeral 680). As the flow egress the port the destination tag ($2^{nd}$ Label) is placed on the packet (box 684).

When a multi-cast packet is sent to a port that has not been enabled for that packet (output "NO" from box 670 designated with reference numeral 690), that packet is dropped from its buffer (Exit 700).

Figure 9:
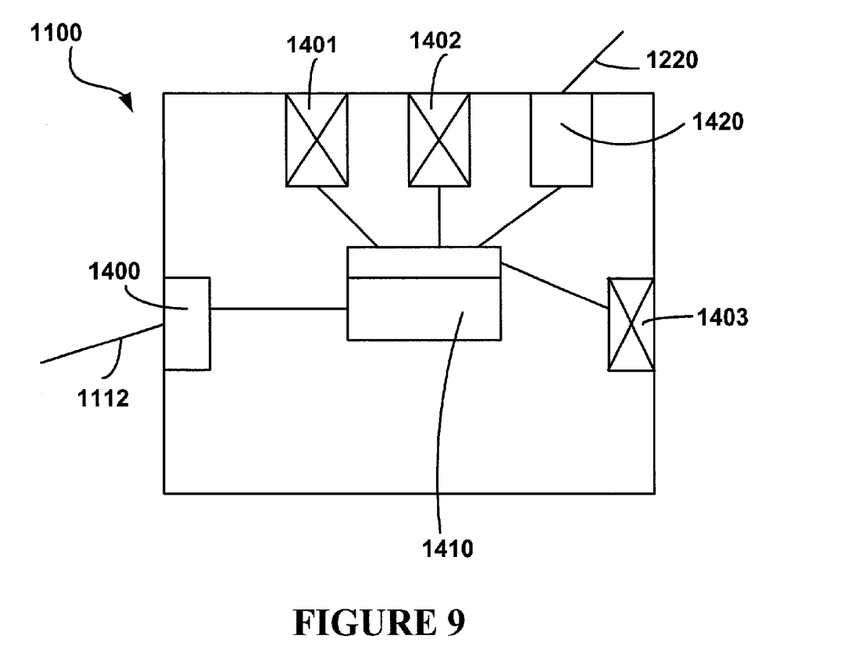
FIG. 9 is a diagram illustrating means for flooding and filtering a data flow within a network node.

FIG. 9 illustrates a means for flooding and filtering a data flow within a network node, i.e. the means, which manage the flow within, e.g. node "A", when packets from flow 1112 arrive. The packets from the flow 1112 are forwarded by a sequencing type device of an input interface 1400 to a controller 1410, where they have their special multi-cast labels and multi-cast service numbers embedded into the stacked labels (box 660). These packets, now forming flow 1201, are then sent to all egress ports of node "A". In this case, ports 1401, 1402 and 1403 are not enabled. Egress port 1420 is enabled so the multi-cast packet is passed onto the next process for transmission.

Figure 10:
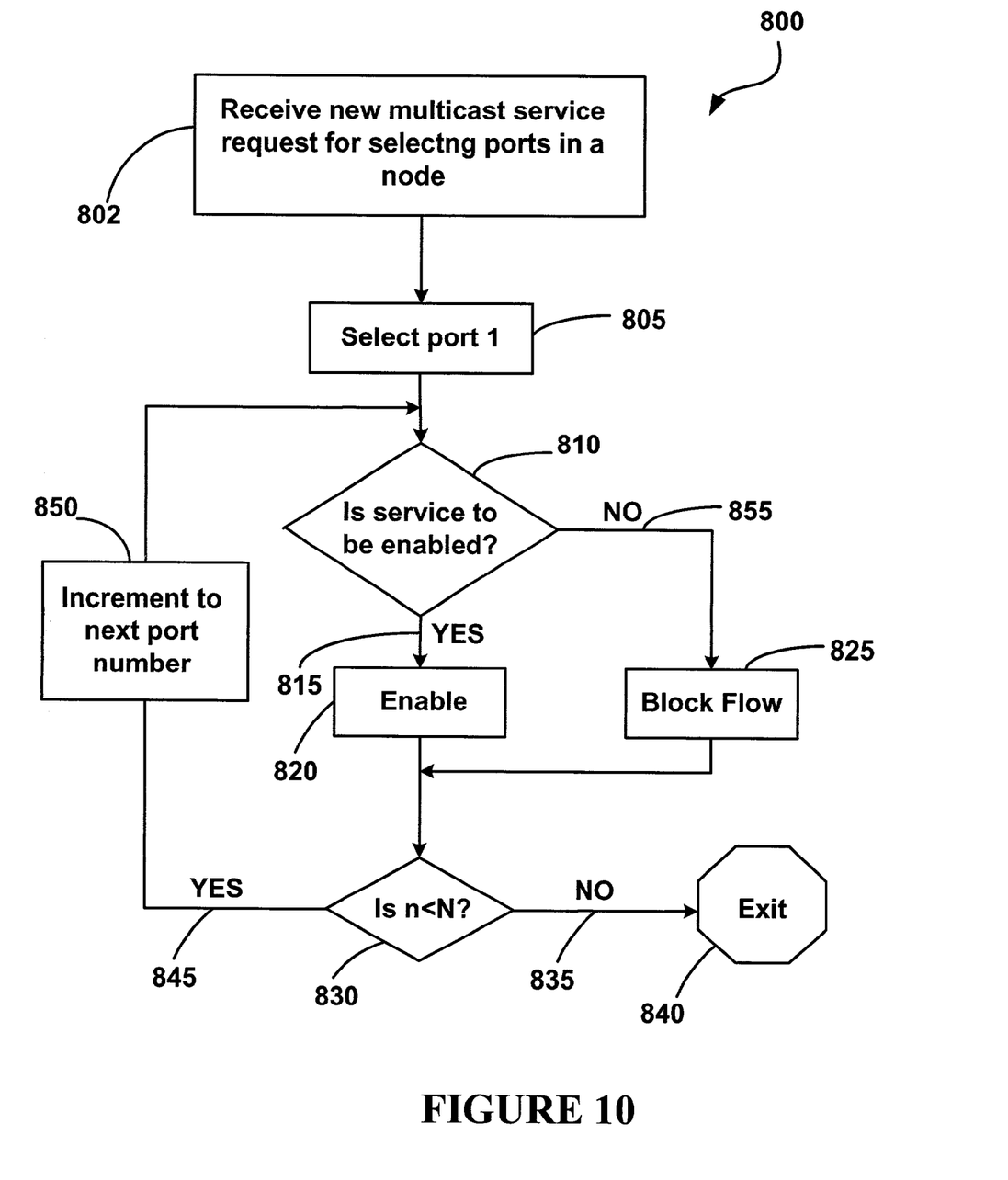
FIG. 10 is a flow chart illustrating a process for the enablement of the multi-cast service at prescribed exit ports of a network node.

FIG. 10 is a flow chart illustrating a process for the enablement of the multi-cast service at prescribed exit ports of a network node. Selected ports are instructed to either enable or inhibit the egress of labeled multi-cast packets. The controller 1410 receives an instruction to implement a new multi-cast service in a node (box 802). This node has a sequence of ports. It selects its first node (box 805), checks if the service is enabled (box 810) and looks for logical outcomes "Yes" 815, or "No" 855 from the box 810. If the answer is "Yes" 815, that port is instructed to enable the new flow address (box 820). If the answer is "No" 855, the port is instructed to block this flow (box 825). In either case, the next step is to check the number of the ports completing this task (box 830). Had the number been equal to the number of ports registered with the node's controller (exit "No" labeled as 835 from box 830), then the sequencing and new enabling process would terminate (Exit 840). If the number is less than the registered number of ports associated with the node's controller (outcome "Yes" 845 from box 830), then it is instructed to sequence to the next port (box 850). The cycle repeats itself until all ports have been queried.

Another method for creating the multi-cast service is based on the creation of the uni-cast LSPs used in the service. As the uni-cast service LSPs are created, the nodes and ports which they traverse are added to the multi-cast tree. Thus as a uni-cast LSP exits a node at a port, the egress filter for that port is updated to allow multi-cast traffic.

In the situation when the multi-cast flow is to leave a network it does so via an LER. The stacked labels are removed by the enabled port 1420. In the case when ingress flow 1112 becomes network flow 1201 and 1202 between Nodes "A", "C" and "E", the network flow is both forwarded and terminated at Node "C", and it is only terminated at Node "E".

In this manner, several sets of flows can be implemented in a network. These are often referred to as flow trees. They can be of considerable size and variety, limited mainly by address space and physical bandwidth of the network.

It is also noted that implementation of multi-cast service at each port has been shown via a flood and filtering process, because it several advantages. It might also be done with a variety of switching techniques such as are common in the industry.

While the hierarchy of labels introduced into data in the first and second embodiments include only two labels, it is contemplated that in general case the hierarchy of labels may comprise N labels, each label in the hierarchy being dependent upon, processed immediately after, and deriving the function to be performed from the label above it.

Conveniently the network including the means for allocating and controlling the hierarchy of labels may further means for performing one or more of the following:

means for assessing if the required number of flow and sub-flow packets are arriving at the label edge so as to meet the conditions of service;

means for setting a flag in the network if there is a failure in flow or sub-flow characteristic between the two label edge routers; and means for providing services to network users by identifying certain flows and attributing sub-flows to them.

It may also include means for identifying a data sub-flow as common to a number of the data flows between the two label edge routers and sending one instance of the sub-flow between the edge routers. In said situation, where a sub-flow is sent as the common sub-flow, it may additionally include means for the redistribution of the common sub-flow to the various flows at the exit Edge Router.

It is understood that space allocated to each label in the hierarchy may also vary. Conveniently, it may be chosen equal to a standard MPLA label length of 20 bits, or alternatively, selected from a certain range, e.g. from 4 bits to 128 bits.

The embodiments of the invention described above provide multiple advantages. First, the control plane mappers 300, 310 associated with the nodes, can append a hierarchy of labels to MPLS packets, which includes certain complementary, marketing, or maintenance features, and which is provided in the form of a sub-flow within a flow. The immediate availability of the sub-flows, without further processing, is an advantage. Also, the described method permits sub-flows to have time sensitive markers, encoding algorithms or keys to enable the quality of the data service to be enhanced, these potentially being of high value. Additional value lies in the ability to overlay a grouping of packets within a system which already has a flow mechanism, and to insert these sub-flows without the need for any changes to the primary flow mechanisms, technology or processes. In other words, for the MPLS technology in particular, this can be implemented in a transparent way with independent technology engines and on equipment development schedules, which do not need to be aligned with other network technologies systems or personnel.

By identifying some flows as multi-cast, the described method offers the opportunity to reduce the number of duplicate packets being transmitted between network nodes, thus increasing network utilization efficiency.

By introducing the notion of flooding and filtering mechanism within each node, it reduces the need to change headers as members of a multi-cast are added or dropped from a service. The service can operate essentially at the speed and complexity of the signaling or billing system. It also reduces header and address space churn.

Applications of the described method are numerous. They could be in having the service provider to add layers of service such as keys, synchronization mechanisms, alarm enablers and many others. They may also be used to add value added services in the application space, such as linking advertising to physical proximity, conferencing of services, signaling with environment for mobile applications. Of primary concern also is the ability to maintain link integrity across a network. Should there be lost packets, or families of lost packets, the LERs will readily know about this problem due to the immediate availability of the associated address spaces.

Although specific embodiments of the invention have been described in detail, it will be apparent to one skilled in the art that variations and modifications to the embodiments may be made within the scope of the following claims.

What is claimed is:

1. A data network having a plurality of nodes, comprising:
   means for allocating a hierarchy of attribute labels to data in a data flow, comprising a hierarchy of data sub-flows, so that the hierarchy of the allocated labels corresponds to the hierarchy of data sub-flows within the data flow;
   means for transmitting data having the allocated labels between the nodes in the network; and
   means for detecting the allocated labels and processing the labels according to the label hierarchy.

2. A network as described in claim 1, wherein the network is a packet network.

3. A network as described in claim 2, wherein the packet network is a Multi-Protocol Label Switched (MPLS) network having the data flow between two label edge routers.

4. A network as described in claim 1, wherein the network is a frame network.

5. A network as described in claim 4, wherein the frame network is a high density link controlling (HDLC) network.

6. A network as described in claim 3, wherein the means for allocating the hierarchy of labels comprises means for establishing dependency of labels within the hierarchy so that positions of labels in the hierarchy identify a sequence of processing of the labels and functions associated with the labels.

7. A network as described in claim 6, wherein the means for allocating the hierarchy of labels comprises:
a first control plane mapper for releasing available labels, and a first controller for assigning the released labels according to the label hierarchy.

8. A network as described in claim 7, wherein the first control mapper comprises a state machine capable of allocating a unique hierarchy of labels for each of the flow and sub-flow combination between the edge routers.

9. A network as described in claim 6, wherein the means for transmitting comprises a line driving device on a forwarding node and a receiving interface on a receiving node.

10. A network as described in claim 6, wherein the means for detecting comprises a second controller for detecting the hierarchy of labels according to the label dependency, and a second control plane mapper for maintaining current label dependency within the hierarchy.

11. A network as described in claim 6, wherein the hierarchy of labels includes N labels, each label in the hierarchy being dependent upon, and processed immediately after, and deriving its function from the label above it.

12. A network as described in claim 11, wherein N=2, the hierarchy of labels comprising a first label and a second label, the second label being dependent on the first one.

13. A network as described in claim 11, wherein N=3.

14. A network as described in claim 11, wherein N is selected from a range from 4 to 10.

15. A network as described in claim 3, wherein the means for allocating labels comprise s means for allocating a space for each label itself equal to 20 bits.

16. A network as described in claim 3, wherein the means for allocating labels comprises means for allocating a space for each label in the hierarchy within a range from 4 bits to 128 bits.

17. A network as described in claim 6, further comprising means for re-addressing the hierarchy of labels at the label edge router.

18. A network as described in claim 12, wherein the first label in the hierarchy identifies a Forwarding Agency label switched path (FA-LSP) flow, and the second label identifies a sub-flow within the FA-LSP flow.

19. A network as described in claim 6, wherein one of the labels in the hierarchy is a multi-cast service label.

20. A network as described in claim 19, wherein all packets labeled with the same multi-cast label follow the same label switched path in the network.

21. A network as described in claim 19, wherein the multi-cast service label is associated with a function for flooding data to all ports within a node, and simultaneously enabling only those ports at the node, for which egress is required.

22. A network as described in claim 20, wherein the same path is the path established so as to provide one of the following:
required traffic load in the network, and
controlled delay in arrival times of the multi-cast packets.

23. A method for managing data in communications data network, comprising the steps of:
forming a data flow, having a hierarchy of data sub-flows;
allocating a hierarchy of attribute labels to data in the data flow, corresponding to the hierarchy of data sub-flows;
transmitting data having the allocated labels between nodes in the network;
detecting the allocated labels; and
processing the labels according to the label hierarchy.

24. A method as described in claim 23, the method being applied for managing data in Multi-Protocol Label Switched (MPLS) packet network having the data flow between two label edge routers.

25. A method as described in claim 24, wherein the step of allocating the hierarchy of labels comprises establishing dependency of labels within the hierarchy so that positions of labels in the hierarchy identify a sequence of processing of the labels and functions associated with the labels.

26. A method as described in claim 24, wherein the step of allocating the hierarchy of labels comprises releasing available labels and assigning the released labels according to the label hierarchy.

27. A method as described in claim 26, wherein the step of releasing the labels comprises releasing a unique hierarchy of labels for each of the flow and sub-flow combination between the edge routers.

28. A method as described in claim 24, wherein the step of allocating comprises allocating the hierarchy of labels including N labels, each label in the hierarchy being dependent upon, and processed immediately after, and deriving its function from the label above it.

29. A method as described in claim 24, wherein the step of allocating comprises allocating labels so that each of the labels itself occupies one of the following:
a space of 20 bits; and
a space within a range from 4 bits to 128 bits.

30. A method as described in claim 24, wherein the step of allocating further comprises re-addressing the labels within the hierarchy.

31. A method as described in claim 28, wherein the step of allocating comprising allocating the hierarchy including a first and second labels (N=2), the first label identifying a Forwarding Agency label switched path (FA-LSP) flow, and the second label identifying a sub-flow within the FA-LSP flow.

32. A method as described in claim 25, wherein the step of allocating comprises allocating one of the labels in the hierarchy as a multi-cast service label and associating a function with this label that all packets having the same multi-cast label follow the same label switched path in the network.

33. A method as described in claim 32, wherein the step of allocating further comprises associating another function with the multi-cast service label, which provides flooding of data to all ports within a node and simultaneously enables only those ports at the node, for which egress is required.

34. A method as described in claim 32, wherein the step of allocating comprises allocating another label in the hierarchy, which identifies the egress LSP label to be dependent onto the multiast label to define the path to the next destination.

35. A system for allocating and controlling labels in an MPLS packet network, comprising:
means for allocating a hierarchy of attribute labels to packets in a data flow, comprising a hierarchy of data sub-flows, so that the hierarchy of the allocated labels corresponds to the hierarchy of data sub-flows within the data flow;
means for transmitting packets having the allocated labels between the nodes in the network; and
means for detecting the allocated labels and processing the labels according to the label hierarchy.

* * * * *